US011681646B1

(12) United States Patent
Miglani et al.

(10) Patent No.: US 11,681,646 B1
(45) Date of Patent: Jun. 20, 2023

(54) MEMORY DISAGGREGATION AND REALLOCATION

(71) Applicant: Drut Technologies Inc., Nashua, NH (US)

(72) Inventors: Jitender Miglani, Hollis, NH (US); Dileep Desai, San Jose, CA (US)

(73) Assignee: Drut Technologies Inc., Nashua, NH (US)

( * ) Notice: Subject to any disclaimer, the term of this patent is extended or adjusted under 35 U.S.C. 154(b) by 18 days.

(21) Appl. No.: 17/673,619

(22) Filed: Feb. 16, 2022

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01)

(58) Field of Classification Search
CPC .................. G06F 13/4027; G06F 13/1668
See application file for complete search history.

(56) References Cited

U.S. PATENT DOCUMENTS

| 7,945,722 | B2 | 5/2011 | Stewart et al. | |
|---|---|---|---|---|
| 11,416,431 | B2* | 8/2022 | Malladi | G06F 12/1045 |
| 2015/0058506 | A1* | 2/2015 | Muhsam | G06F 13/4027 710/104 |
| 2017/0300445 | A1* | 10/2017 | McKnight | G06F 13/4068 |
| 2020/0133913 | A1* | 4/2020 | Joshi | G06F 15/7896 |
| 2022/0318073 | A1* | 10/2022 | McLean | G06F 9/505 |
| 2022/0350767 | A1* | 11/2022 | McGraw | G06F 11/1423 |

OTHER PUBLICATIONS

Ian Cutress, "Avago Announces PLX PEX9700 Series PCIe Switches: Focusing on Data Center and Racks", article, https://www.anandtech.com/show/9245/avago-announces-plx-pex9700-series-pcie-switches, published May 12, 2015.
Farrington et al, "Helios: A Hybrid Electrical/Optical Switch Architecture for Modular Data Centers", journal, ACM SIGCOMM Computer Communication Review vol. 40 Issue Oct. 4, 2010 pp. 339-350, https://dl.acm.org/doi/10.1145/1851275.1851223.

(Continued)

*Primary Examiner* — Henry Tsai
*Assistant Examiner* — Christopher A Daley
(74) *Attorney, Agent, or Firm* — SoCal IP Law Group LLP; Angelo J. Gaz; Steven C. Sereboff

(57) ABSTRACT

A server rack has server sleds, each including a motherboard upon which is mounted: a memory module, a cache, at least one CPU connected to the cache, a memory controller connected to the cache and the memory module, an I/O hub, and a fabric interface (FIC) having a memory bridge and optical transceivers, where this memory bridge is connected to the I/O hub through this motherboard. The rack also has a memory sled disaggregated from the server sleds and that includes: a motherboard upon which is mounted: memory modules and a FIC having a memory bridge, a memory controller and optical transceivers, wherein this memory controller is connected to these memory modules through this motherboard, and wherein this memory bridge connects the memory controller to the optical transceivers. The rack has a photonic cross-connect switch interconnected by optical fiber cables to the optical transceivers of the server and memory sleds.

22 Claims, 4 Drawing Sheets

(56) References Cited

OTHER PUBLICATIONS

Gonzalez et al., Optically Connected Memory for Disaggregated Data Centers, journal, published Aug. 25, 2020, 8 total pages.

Khani et al., SiP-ML: High-Bandwidth Optical Network Interconnects for Machine Learning Training, journal, SIGCOMM '21: Proceedings of the 2021 ACM SIGCOMM 2021 Conference Aug. 2021, pp. 657-675, https://doi.org/10.1145/3452296.3472900.

Lim et al., Disaggregated Memory for Expansion and Sharing in Blade Servers, ISCA '09: Proceedings of the 36th annual international symposium on Computer architecture, Jun. 2009, pp. 267-278, https://doi.org/10.1145/1555754.1555789.

Lim et al., System-level Implications of Disaggregated Memory, Published Feb. 25, 2012, Computer Science IEEE International Symposium on High-Performance Comp Architecture, total of 12 pages.

Liu et al., Memory Disaggregation: Research Problems and Opportunities, Published in: 2019 IEEE 39th International Conference on Distributed Computing Systems (ICDCS), Date of Conference: Jul. 7-10, 2019, Date Added to IEEE Xplore: Oct. 31, 2019, https://ieeexplore.ieee.org/document/8885074.

Multi-Host Sharing of NVMe Drives and GPUs Using PCIe Fabrics, white paper, Oct. 2019, Multi-Host_Sharing_NVMe_Drives_GPUs_Using_PCIe_Fabrics.pdf, last accessed Feb. 16, 2022, 18 total pages.

Shalf et al., Photonic Memory Disaggregation in Datacenters, Advanced Photonics Congress (IPR, Networks, NOMA, NP, © OSA), journal, https://people.csail.mit.edu/ghobadi/papers/mem_disaggregation_photonics_congress_2020.pdf, last accesses Feb. 16, 2022, 2 total pages.

Pramod Subba Rao et al., ANCS '16: Proceedings of the 2016 Symposium on Architectures for Networking and Communications Systems, Mar. 2016, pp. 75-80, https://doi.org/10.1145/2881025.2881030.

Padala et al., Time for memory disaggregation?, article, https://www.ericsson.com/en/blog/2017/5/time-for-memory-disaggregation, published May 23, 2017.

Wang et al., Semeru: A Memory-Disaggregated Managed Runtime, journal, https://www.usenix.org/system/files/osdi20-wang.pdf, last accessed Feb. 16, 2022.

* cited by examiner

US 11,681,646 B1

MEMORY DISAGGREGATION AND REALLOCATION

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to disaggregated, re-allocatable memory.

Description of the Related Art

Cloud and edge data center traffic is growing at a high rate, driven by diverse workloads (with mixed resource needs) that exist in today's data centers. This large amount of data can exceed processing capacity. With the emergence of internet of things (IoT) edge computing, the gap between data volume and processing capacity will widen.

Existing infrastructure has servers built with various resources (central processing unit (CPU)/memory, graphics processing unit (GPU), network interface card (NIC), data storage, etc.) deployed with limited variants of static hardware boundaries, causing fragmentation or inefficiencies over time if resources are not utilized fully to their installed capacity and remain stranded, leading to buildup of inefficiencies over time. While IO resources (GPU, network, storage cards) come in PCIe standard form-factor and can be disaggregated, CPU/memory are still considered together (e.g., aggregated) and typically located on the same server motherboard, with (a) physical traces that are a few millimeters to centimeters apart, (b) memory choices specialized by type, size, speed, number of controllers, etc., and (c) a limited number of dual inline memory module (DIMM) slots per CPU socket. Considering all this, memory configurations are very expensive, so much so that sometimes motherboards do not even max out DIMMs sockets on the servers.

As used herein the terms memory, storage and cache are distinct. The main difference between memory and storage is that memory stores data short-term for immediate access. The CPU has direct access to memory but the CPU accesses storage through an I/O controller. Memory is made from random access memory (RAM) and usually volatile; storage is always non-volatile. Memory is always solid state, but storage may be solid state or electromechanical (e.g., a hard drive). A cache is high speed and volatile, and it is either disposed within the CPU chip or within a module into which the CPU is installed. Memory chips are either installed directly in a motherboard or in a small printed circuit board (e.g., PCB or board) which is installed in the motherboard, and is therefore distinct from the CPU and is not installed in a CPU module.

One common form of memory is the module, made up of a series of dynamic RAM (DRAM) chips mounted on a printed circuit board having an edge connector for installing in a motherboard. One common memory module format is the DIMM, or dual in-line memory module. Servers usually have DDR (double data rate) DIMMs, which makes higher transfer rates possible through strict control of the timing of the electrical data and clock signals. Multiple DRAM chips with a common bus (address and data) are called a memory rank. A memory module may bear more than one rank.

Building a computer involves an array of related decisions, including memory capacity. Computers are usually built with enough memory to accommodate the applications with the largest memory requirements in the workload. As a result, computers are often provisioned with more memory than is required by the majority of jobs. One study indicates that a minor percentage of jobs require nearly all memory, and more than half of CPU hours go to jobs that consume considerably less than all memory. Thus, it is recognized that computers, especially servers, are usually overbuilt with memory, resulting in fragmentation, inefficiency, extra capital costs (e.g., memory modules, electrical interconnects, rack space, floor space) and extra operating costs (power to the modules, cooling, rent). For example, in the absence of any advance knowledge of what workload will eventually run on a server, its memory is overbuilt to ensure it can handle various possible workloads.

Various architectures have been proposed for pooling memory. For example, multi-core CPUs utilize shared memory. Most modern supercomputers use a hybrid type of memory architecture combining both shared and distributed memory architectures. Intel Corp., a leading CPU vendor, has developed several memory sharing architectures including Quick Path Interconnect (QPI) and Ultra Path Interconnect (UPI), which define interconnect standards for scalable multiprocessor systems with a shared address space. In QPI and UPI, each CPU has directly-attached memory, and other CPUs have access to that memory via a caching and home agent in the CPU which is directly attached to the memory. The PINE architecture (Photonic Integrated Networked Energy) is a fundamental departure from established computer architecture with a priority on low power consumption. Although the concept of memory disaggregation has been proposed, there remains a desire for a memory disaggregation architecture suited to the CPU/memory architecture used in typical servers.

Server computers, also called servers herein, typically have an architecture in which core computing (i.e., CPU, memory and input/output (I/O) interface) are disposed on a single board called a sled, chassis or blade. Servers are typically installed into racks which provide power and local area network (LAN) connectivity. Racks are typically aggregated into pods. Pods are typically aggregated into zones. Zones are typically aggregated into data centers. Storage and other peripherals may be installed at various levels of this architectural organization.

In a typical two-socket CPU server, the sled has two multi-core CPU modules. Each CPU module is installed in its own socket, with the CPU modules connected via QPI or UPI. Each CPU module has its own memory (DRAM) controller. The sled has two sets of DIMM sockets—one set for each CPU module. Each CPU module is connected to its respective set of DIMMs through its respective CPU module's memory controller via a DRAM interface. Each CPU module also has its own I/O interface as well as level 2 and level 3 caches.

Figure 1:
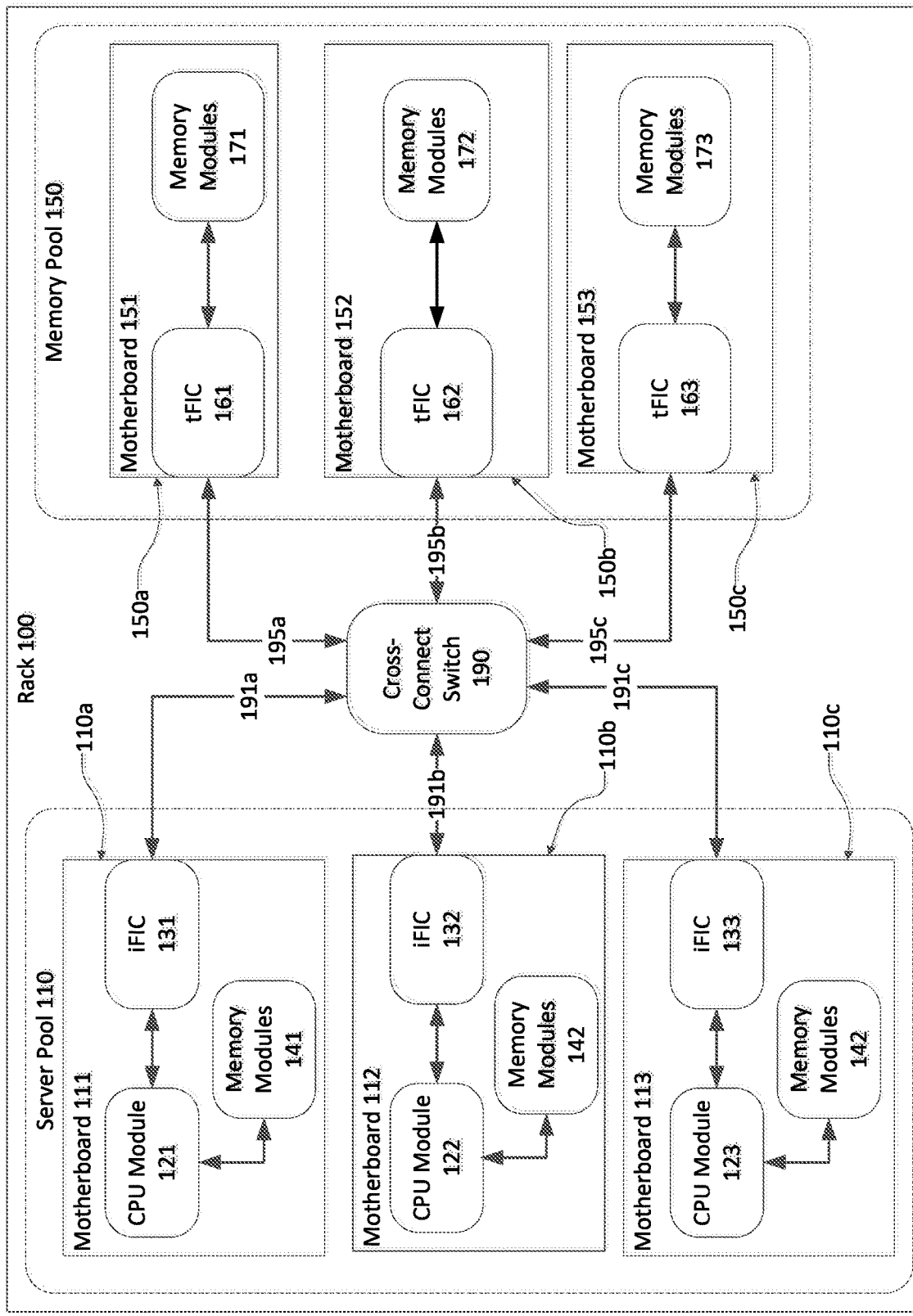
FIG. 1 is a system-level diagram of a server rack having a disaggregated memory architecture.

Elements shown in the figures are physical and therefore the relationships between elements is physical. Where relationships are logical, rather than physical, they are specifically described as such. In the drawings, physical elements and relationships are shown in solid lines, and logical elements and relationships are shown in dash lines

DETAILED DESCRIPTION

In accordance with the architectures described herein, servers have nominal local memory and lean on remote or disaggregate memory to augment the local memory. The remote memory is provided through a memory allocation mechanism which allows the remote memory to be allocated amongst a number of servers based upon the memory resources needed by each server. This approach provides the added flexibility of offloading many operations in remote memory/buffers with their distributed controllers and negating the need for constant direct memory accessing (DMA'ing) back and forth that otherwise would reduce performance. This results in a cloud infrastructure architecture which is more agile in terms of resource allocation and utilization, and therefore well suited to growth while overcoming the inefficiency of building computers with memory capacity set to the maximum likely needed. Memory that is aggregated may be considered directly connected, local or together. This may be opposite of being considered separated, remote or disaggregated. Being located remotely or being disaggregated may be located in another PCB, device chassis, equipment rack, sled or room. In some cases, being remote or being disaggregated includes being connected using a computer network interface card such as a fiber interface card used to network different computing devices.

The disclosed solution will result in direct benefits (CapEX/OpEX reduction or throughput improvement) for data center providers of all kinds (cloud, edge, enterprise, government), who shall pass on the benefits to their end customers in terms of the flexibility of services with exceptional user experience at competitive prices; thereby enabling affordable computing capabilities to the general public at the utility scale. Such an environment would allow local communities (towns/states) to offer computing resources at grassroot levels; thereby bringing each and every citizen into a digital framework, which itself has potential to impact all lives for better-irrespective of race, gender and/or socio-economic background.

Effective utilization of resources will also boost collaboration among higher institutions, researchers, and academia. It will also improve the use of government or commercial resources. Lower latencies and higher-throughput will help drive application performances in sectors such as defense/intelligence, and will also open up the environment for new applications and designs that were not possible before.

The disclosed architecture also brings futuristic elements of solution (e.g., data-rate agnostic, full-spectrum wavelength support) that would allow for integration with other upcoming technologies (e.g., 5G, IoT, silicon photonics) that are getting ready for a breakthrough at the commercial scale. Overall, efficient data centers will consume less energy compared to today. In the process, with fine-grained monitoring and control of individual resources via AI/ML based technologies, even more efficient datacenter building infrastructure can be conceived. This also has potential to spread energy efficiencies to non data center industries, thereby reducing the carbon footprint even further.

The disclosed architecture decouples or disaggregates the standard strict CPU-memory arrangement, and also departs from the CPU-to-CPU interconnect of QPI and UPI. In the disclosed architecture, the CPU continues to have some amount of directly connected memory on the same server sled. However, additional disaggregated memory or memory blocks on a separate, memory sled is available to the CPU. The memory sled has a number of memory modules and/or blocks, and has a controller. Between the CPU and the additional memory is a Layer 1 switch, such as a photonic cross connect switch. Ranks of memory blocks on the memory sled may be allocated to a per-CPU basis. Thus, in a per-rank basis, the allocation of ranks may be reconfigured or reallocated. This reconfiguration is done on a hardware level. Latency between the CPU and the additional memory is minimized through the Layer 1 switch.

The disclosed architecture provides compatibility with existing technologies. Off-the-shelf racks, power supplies, CPUs, memory modules and operating systems may be used as part of the architecture. Software initialization may be transparent so that basic input output system/operating system (BIOS/OS) system drivers for individual memory modules don't need to be rewritten.

Referring now to FIG. 1, there is shown a system-level diagram of a server rack 100 having a disaggregated or remote memory architecture. The server rack 100 includes a number of server sleds 110a, 110b, 110c logically grouped in a server pool 110, a number of memory sleds 150a, 150b, 150c logically grouped in a memory pool 150, and a cross-connect switch 190. A memory sled may include multiple memory blocks or modules. FIG. 1 shows three server sleds that are each disaggregated from each of three memory sleds, but the server rack 100 may have some other plurality of server sleds, and may have one or some other plurality of memory sleds. The number of server sleds and memory sleds may be determined by technical and practical requirements such as total processing capability, cost and physical space. The number of server sleds and memory sleds may also be determined to simultaneously accommodate a target number of applications and jobs based on the projected largest total memory requirement of their target workload. The server sleds 110a, 110b, 110c are materially identical and therefore only server sled 110a is described. Likewise, the memory sleds 150a, 150b, 150c are materially identical and therefore only memory sled 150a is described.

In some cases, there may be more than a single rack, such as where motherboards of pool 100 and/or of pool 150 are located in other racks that are nearby to rack 100 and are connected to each other as noted by a properly sized PXC switch (photonic x-connect switch) 190 to accommodate the number of devices connecting to it. This configuration can be as large in single direct point to point or close configuration.

The server sled 110a has a motherboard 111, and mounted on the motherboard 111 are a CPU module 121 connected to a number of memory modules 141 and connected to a fabric interface 131. In FIG. 1 the fabric interface 131 is labeled as iFIC, which stands for initiating fabric interface card. That is, the fabric interface 131 may be a card, and in operation initiates data transfers (transmit and receive, as the case may be) through the cross-connect switch 190. In some cases, interface 131 has hardware (e.g., BIOS or ROM) and/or software that can be programmed, such as to configure and/or reconfigure the interface. These data transfers may be bidirectional data transfers to and from CPU 121, through the cross-connect switch 190. The motherboard 111 has an edge connector (not shown) for plugging the motherboard 111 into the rack 100. The memory modules 141 may be DIMMs arranged in ranks of DRAM.

The memory sled 150a has a motherboard 151, and mounted on the motherboard 151 are a number of memory modules 171 connected to a fabric interface 161. In FIG. 1 the fabric interface 161 is labeled as tFIC, which stands for target fabric interface card. That is, the fabric interface 161 may be a card, and in operation is the target of data transfers through the cross-connect switch 190. In some cases, interface 161 has hardware (e.g., BIOS or ROM) and/or software that can be programmed, such as to configure and/or reconfigure the interface. These data transfers may be bidirectional data transfers to and from memory modules 171, through the cross-connect switch 190. The motherboard 151 has an edge connector (not shown) for plugging the motherboard into the rack 100. The memory modules 171 may be DIMMs with ranks of DRAM chips.

The cross-connect switch 190 is a Layer 1 switch which provides reconfigurable circuit switching between the server sleds 110a, 110b, 100c on the one hand and the memory sleds 150a, 150b, 150c on the other. The cross-connect switch 190 may be a photonic switch having two-axis comb-drive micro-mirror arrays, providing low latencies (~5 nsec).

The server rack 100 may include optical fiber cables 191a, 191b, 191c interconnecting the cross-connect switch 190 and, respectively, the server sleds 110a, 110b, 110c. The server rack 100 may include optical fiber cables 195a, 195b, 195c interconnecting the cross-connect switch 190 and, respectively, the memory sleds 150a, 150b, 150c.

The cross-connect switch 190 can be any one or more types of low latency mediums or data paths, such as an optical and/or electrical data path. For example, an optical data path can have fiber optic connectivity that uses an optical switch, an optical crossbar or any other optical arrangement, in which two endpoints can be optically connected (e.g., point-2-point) for optical data transport using cables 191 and 195. An optical circuit switch is one way to connect two endpoints. The optics can be single mode optics or multi-mode optics. Example electrical data paths can have direct copper cabling, wires and/or traces by which two endpoints are electronically connected for electrical data transport (not shown but used in place of optical fibers using cables 191 and 195). A combination of optical and electrical data paths can also be used. In this case, the endpoints can be the same type of data path such as where both are electrical or optical. In some cases, the transport can be an OEO (optical-electrical-optical) direct interface or via a switch if the overall switching latency is within the timeframe of the timers that both ends of memory bus or PCIe fabric require. In some cases, the transport can be a 3D MEMS based PXC (photonic cross-connect) switch. The data path transport is a part of the computing system that forms connections between pairs of data communications paths of multiple ports such as ports of multiple computing asset server pools and memory pools.

The server rack 100 therefore provides memory to the CPUs in two locations. The server sleds 110a, 110b, 110c have local, on-board memory modules 141, 142, 143 which is directly connected (e.g., local or aggregate) to the respective CPU modules 121, 122, 123. The memory sleds 150a, 150b, 150c have their own respective on-board memory modules 171, 172, 173 which may be connected indirectly (e.g., remote or disaggregate) to the CPU modules 121, 122, 123. Whereas the local memory modules 141, 142, 143 are permanently attached to their respective, same-board CPU modules 121, 122, 123, the remote memory modules 171, 172, 173 are disaggregated from the server sleds 110a, 110b, 110c, but may be allocated and reallocated to the CPU modules 121, 122, 123. The manner of allocation and reallocation is described below. But first, server sleds and memory sleds are described in more detail. In some cases, on a physical level, allocation is the process of allocating a memory resource block (which may be a group of memory DIMMS, clubbed together to a memory controller), which is ready to be attached to a CPU processor as remote directly attached memory. Similarly, when the need for that remote memory is over, the same resource block could be released back to the available pool for allocation (e.g., reallocated) to other CPUs or could be reconfigured to other memory controllers (e.g., reallocated) such that the size of any resource block itself changes.

This allocation/reallocation may also require careful orchestration in operating systems parameters to make sure correct memory addresses ranges are defined/assigned and therefore are available to kernel and user applications running on that CPU.

As used herein, the term direct connection means that a connection between two integrated circuit (IC) (or PCB) components is electrical only and there are no intervening IC components. As used herein, the term indirect connection means that a connection between two IC components has at least one intervening IC component. The conjugates of direct connection and indirect connection, namely directly connected and indirectly connected, have corresponding meanings.

Figure 2:
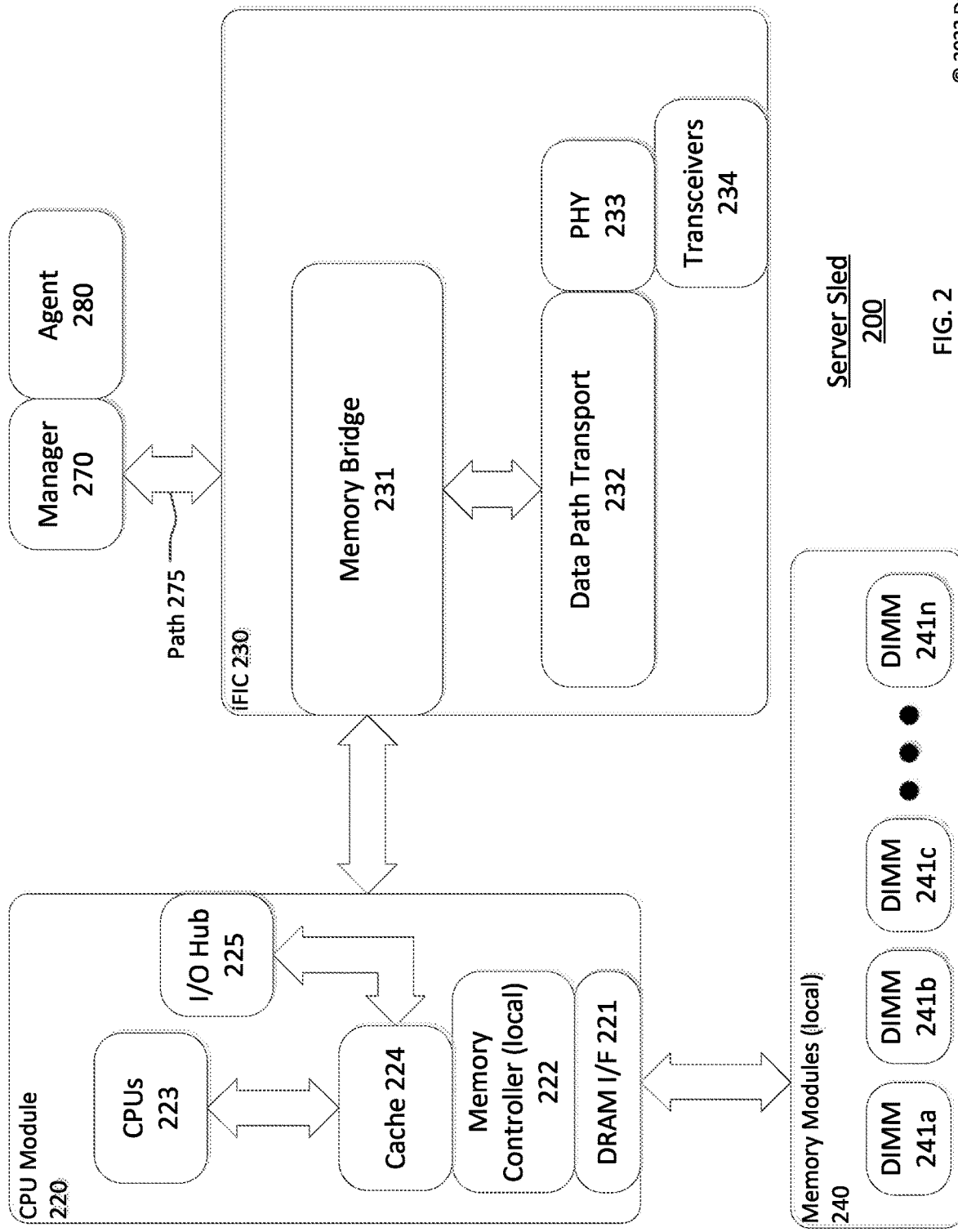
FIG. 2 is a system-level diagram of a server sled.

Referring now to FIG. 2, there is shown a system-level diagram of a server sled 200 which may be any of the server sled 110a, 110b or 110c, and likewise includes a motherboard (not shown) upon which are mounted a CPU module 220, a number of memory modules 240 and a fabric interface 230.

The memory modules 240 may be DIMMs 241a — 241n arranged in ranks of DRAM. As such, the memory modules 240 may be ordinary.

The CPU module 220 is a board with a number of components mounted thereon, including one or more CPUs 223, one or more caches 224, a memory controller 222, a DRAM interface 221 and an I/O hub 225. As such, the CPU module 220 may be ordinary, although loaded with software which is not ordinary and operating in an extraordinary manner. Thus, the CPU module 220 is coupled to and interoperates with the memory modules 240 in an ordinary manner.

The I/O hub 225 is an interface point within CPU with sufficient bandwidth and other capabilities to allow the CPUs 223 to effectively communicate with a memory controller (e.g., controller 222) via cache-coherency (e.g., cache 224). Because memory access must be very fast for the CPUs, in most embodiments I/O standards for communicating with the memory such as PCIe gen3 or gen4 will be inadequate due to lack of in-built cache-coherency support. The I/O hub 225, however does provide support for other bus protocols that may utilize higher speed standards or specifications, such as Xilinx AXI, Intel Avalon, CXL (compute express link), Intel QPI (quick path interconnect) Intel UPI (ultra path interconnect). CPUs 223 may each include CPU cores within each CPU. The CPU cores may be inside the CPU and have no external physical interface, and therefore not be applicable in this discussion.

The fabric interface 230 has a memory bridge 231, a data path transport protocol 232, a PHY 233, and a number of optical transceivers 234. The memory bridge 231 utilizes the same I/O standard as the I/O hub 225 for reliable communications, providing a bridge between the I/O hub 225 and the data path transport protocol 232. The data path transport protocol 232 provides a bit-unaware native protocol to retime iFIC transactions (address/data and sideband traffic) to any number of tFICs 161-163. The PHY 233 may be a chip with multiple SerDes lanes which provides physical, Layer 1 circuitry interfacing between the data path transport protocol 232 and the optical transceivers 234. The optical transceivers 234 provide Layer 1 connectivity from the server sled 200 to a cross-connect switch, such as through optical fiber cables like cables 195a to the cross-connect switch 190.

In practice the data path transport protocol 232 and the PHY 233 each have a number of identical units, one such unit per each of the optical transceivers 234. Thus, if the server sled has two optical transceivers, each optical transceiver is separately connected to its own PHY, and the PHY is connected to its own data path transport. Such a combination of a data path transport unit, a PHY unit and an optical transceiver are a port. The ports on the server sled 200 are considered to be downstream.

Memory requests originating from the CPUs 223 may be intercepted at and bridged by the memory bridge 231 to a downstream port to re-time the memory front-end transactions (address, data and signaling) from the iFIC 230 to the tFIC in the optical clock domain and vice-versa. The memory bridge 231 may include different front-end configurations with dynamic gearboxes to accommodate varying data speeds and width requirements and to faithfully reproduce the same data on the other side. The iFIC 230 may allow a configurable number of SerDes (i.e., channels) to form bundles that implement a singleton independent interface towards exactly one other memory bridge on the tFIC. The iFIC 230 may also implement in-band control-channel to reliably carry out peer-detection, and help with "Initialization and Bring Up" of these memory interconnects (as part of attachment and detachment).

Figure 3:
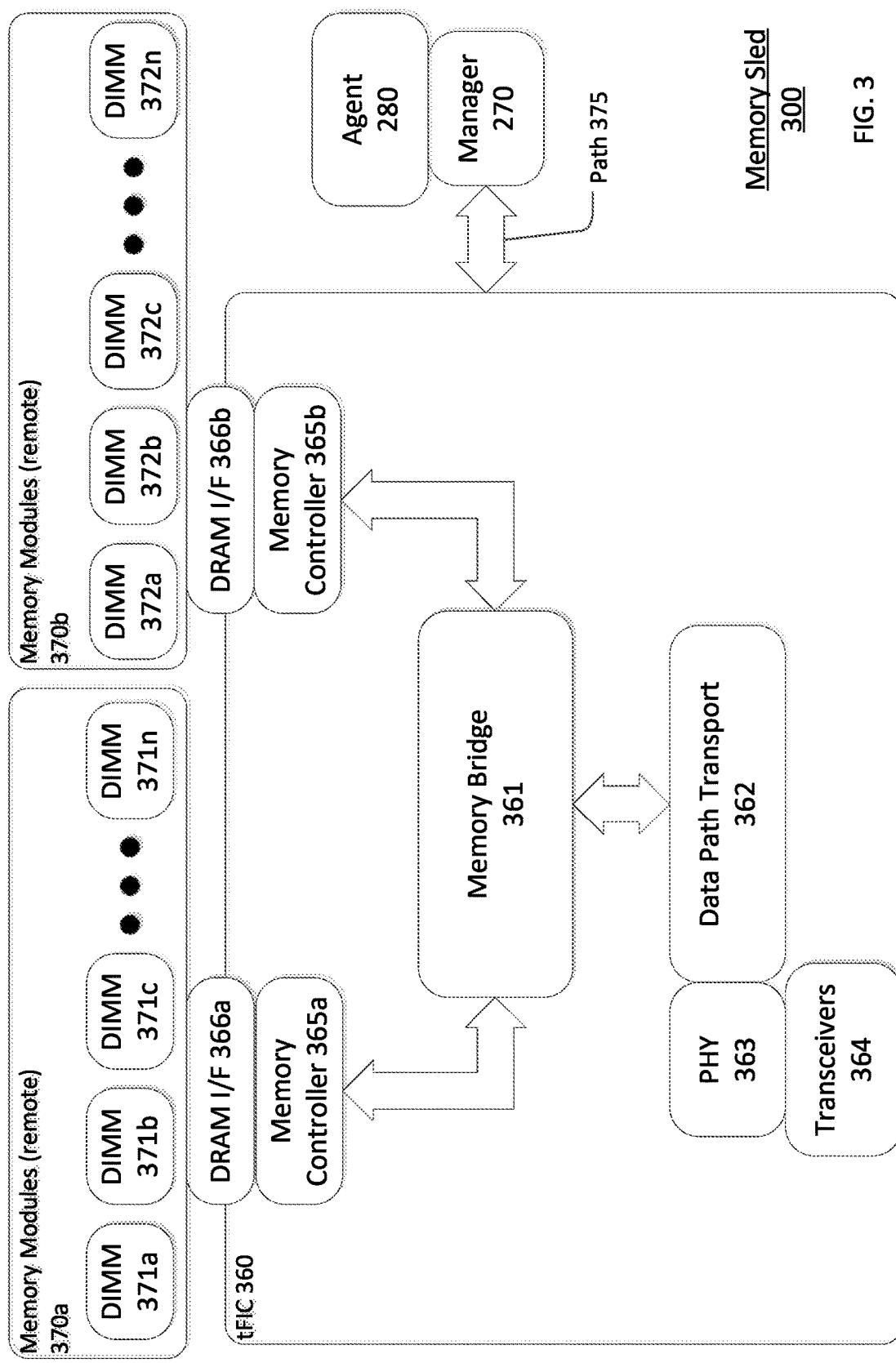
FIG. 3 is a system-level diagram of a memory sled.

Referring now to FIG. 3, there is shown a memory sled 300 which may be any of the memory sled 150a, 150b or 150c, and likewise includes a motherboard (not shown) upon which are mounted a number of memory modules 370a, 370b and a fabric interface 360.

The memory sled 300 may have a number of memory modules 370a, 370b which may be DIMMs 371a — 371n, 372a — 372n arranged in ranks of DRAM. As such, the memory modules 370a, 370b may be ordinary.

The fabric interface 360 has a memory controller 365a, 365b for each memory module 370a, 370b, and also respective DRAM interfaces 366a, 366b for each memory controller 365a, 365b. The DRAM interfaces 366a, 366b are directly connected to the memory controllers 365a, 365b and the memory modules 370a, 370b. Thus, the memory modules 370a, 370b on the memory sled 300 operate the same way and may have the same specifications as the memory modules 240 on the server sled 200. The memory sled 300 has a data path transport protocol 362, PHY 363 and optical transceivers 364, all of which are similar and complementary to those in the iFIC fabric interface 230 in the server sled 200, and in combination are upstream ports. The tFIC fabric interface 360 also has a memory bridge 361 which is directly connected to and bridges the memory controllers 365a, 365b of the memory sled to the data path transport protocol 362.

The memory bridge 361 allows the memory controllers 365a, 365b to be used by CPUs in the server sleds as if the memory controllers 365a, 365b were on the server sled, responding to typical memory commands and data. For example, instead of only using controller 222 and module 240, CPUs 223 can use controller 365a and 365b and modules 370a and 370b, thus doubling or tripling the amount of memory accessed by the CPU.

Once a downstream bundle is formed in the iFIC, the memory transactions are multiplexed, encoded, and transmitted over the IFIC's PHY, such as noted for iFIC fabric interface 230 in the server sled 200. A downstream bundle from a CPU's iFIC is connected to the respective tFIC via the cross-connect switch where the data is deskewed and aligned as noted for tFIC fabric interface 360 in the memory sled 300, to be carried over to specific controllers serving that CPU. For example, CPUs 223 can write data to and read data from modules 370a and 370b, thus doubling or tripling the amount of memory accessed by that CPU.

In some embodiments, the photonic switch 190 is a data path transport; and the transport protocol 232 and/or transport protocol 362 are key components for disaggregating the memory. For example, memory requests originating from the CPUs 223 may be intercepted at and bridged by the memory bridge 231 to transport protocol 232 that re-times the memory front-end transactions (address, data and signaling) from the iFIC 230 to the tFIC in the optical clock domain. In the other direction, memory data originating from the memory modules 370 may be intercepted at and bridged by the memory bridge 361 to transport protocol 362 that re-times the memory front-end transactions (address, data and signaling) from the tFIC 360 to the iFIC in the optical clock domain.

Each of transport protocol 232 and 362 may be a memory bus electrical data to multi-lane retimed parallel PHY Interface configured to convert electrical data received from bridges 231 and 361, respectively, to a retimed parallel version of the memory bus data to be transmitted on transceivers 234 and 364, respectively. The transport protocols 232 and 362 are also configured to convert retimed parallel versions of the memory bus data received from transceivers 234 and 364 to memory bus electrical data transmitted to the bridges 231 and 361, respectively. The FICs 230 and 360 can be configured to transparently extend the multi-lane memory bus or PCIe buses through the bidirectional switch 190 without the computing assets or functional elements of module 220 and 370 being aware of the FICs FICs 230 and 360, the cables 191 and 195, or the switch 190 because the assets and element are not exposed at the I/O hubs 225 and controller 365 to any changes to the memory bus control signals sent or received from bridge 231 and 361, respectively.

In some cases, "memory sleds" is a physical entity that consists of multiple memory modules (DIMMs) that are arranged on the board to be associated with some number of memory controllers such that each one of them (memory controller) can be represented as a memory resource block to the fabric manager. Each of these memory blocks can be attached or detached to the desired CPU via this process of allocation/reallocation.

Also, the same memory controller (i.e., group of DIMMs) can also be accessed by more than one CPUs (or processing block e.g., accelerators) when connected from different CPUs (or processing block e.g., accelerator) as a shared memory resource. This is critical for some applications as they don't have to explicitly exchange the data between processing elements, which otherwise creates performance penalties.

Each of I/O hubs 225 and controller 365 may have a first number of bus data width and each of the one or more bidirectional data cables 191 and 195 has a second number of retimed bidirectional parallel versions of the data width. In some cases, the first number does not equal the second number. That is, the transport protocol 232 may be configured to change the memory bus electrical data received from hub 225 to a different number of lanes of retimed parallel versions of the bus data to be sent by the optical transceiver 234 over a photonic cross-connect switch 190 to a memory sled 300 that is disaggregated from the server sled 200. Also, the transport protocol 362 may be configured to change the memory bus electrical data received from controller 365 to a different number of lanes of retimed parallel versions of the bus data to be sent by the optical transceiver 364 over a photonic cross-connect switch 190 to a server sled 200 that is disaggregated from the memory sled 300. The transport protocols 232 and 362 may also be configured to change the different number of lanes of retimed parallel version of the memory bus data to bus electrical data; such as by performing the reverse of the above change from bus data to retimed parallel memory bus data.

To accommodate the overheads associated with bundling multiple lanes, clock recovery, deskewing, forward error correction (if enabled), and PHY serializations, the data path protocol's logic runs faster (clock domain) than the packetizer logic in the iFIC's memory bridge. The tFIC may recover the clock from incoming data so that it processes data at the same clock as it was transmitted, and then hands off the packets to the device side with its own free-running clock.

A control channel may be provided for peer-to-peer detections and link-layer management. Data paths may be built through out-of-band management which will accommodate rebundling and reconfigurations of memory devices.

A logical connectivity between FICs 230 and 360 may be created by a fabric manager 270 which uses a configuration path 275 connected to FIC 230 and a configuration path 375 connected to FIC 360. The manager may be controlled by a disaggregated fabric agent 280 connected to the manager 270 that is user and/or computer controlled. The manager 270 can be used to configure and reconfigure transport protocols 232 and 362 to carry memory bus data between hub 225 and controller 365 to various numbers of lanes of retimed parallel versions of the memory bus data for transceivers 234 and 364. The manager 270 can also be used to configure switch 190 for communicating any of the various width of retimed parallel versions of the memory bus data between the FICs 230 and 360.

The fabric manager 270 exists out-of-band from the optical switch data signals of switch 190. Here, "out-of-band" (OOB) means that there exists a management path to each server sled 200 and memory sled 300 (or FIC of that sled) that the manager 270 individually controls when these sleds are connected together. There exists a data-path (e.g., wires 191 and 195 and switch 190) between the sleds which is called "in-band". However, since each of these sleds are disaggregated now, an out-of-band management path can be used to control them. Typical this OOB path is used for management or control only, it does not generally carry any in-band data (e.g., any user-data). Manager 270 may be a "computing device" having a processor and memory capable of executing stored instructions to perform some function. The fabric manager 270 may execute a configuration management program to manage the configuration, reconfiguration and/or operation of the sleds and rack 100. The fabric manager 270 is coupled to the sleds and FICs via configuration paths 275 and 375. Each configuration path may be a serial or parallel bus, a local area network, or some other communications path that allows the fabric manager to provide configuration information and/or software to sleds and FICs as those sleds and FICs are assigned to each other, such as during configuring or reconfiguring. The fabric manager 270 is also coupled to the switch 190 which is an element of rack 100 (connection not shown). The fabric manager 270 receives user requests for compute nodes, such as from a fabric agent 280. It then selects available server and memory sleds of the rack 100, instructs the switch 190 to establish the appropriate connections between the selected sleds, and provides configuration information to configure the selected sleds and FICs. Manager 270 may exist within any of the sleds, FICs or within a separate computing device. Manager 270 may exist within a cloud computing data center. Fabric manager 270 can be a computing device having program instructions or a software entity executed by a processor to perform the function of manager 270 described herein. The instructions or software can run on any machine (desktop, severe or Virtual machine computer). Manager 270 connects or manages different elements and FICs of rack 100 by an OOB network (i.e., ethernet switch), such as where the elements and FICs are all connected on a separate management network. Each of the FICs and/or elements have a management port on them (typically 10/100/1000 mega-bits per second) that is connected with an ethernet switch that has a connectivity to the manager 270, such as to a server sled 100 where manager 270 software is running. User data traffic on data-paths of rack 100 does not carry or communicate on this OOB network, instead only control and management traffic goes over this network.

The fabric manager 270 may repeatedly update or reconfigure the configuration and/or operation of the rack 100. Thus, sleds and FICs of rack 100 are disaggregated and reconfigurable. Disaggregation allows sleds of rack 100 to be created in any configuration by coupling the appropriate CPU and memory modules through or using the fabric manager 270. Further, disaggregation allows upgrading or replacing one type of CPU or memory module (or sled) without impacting other modules. Thus, rack 100 may be and have a high throughput, low latency reconfigurable switching fabric.

Figure 4:
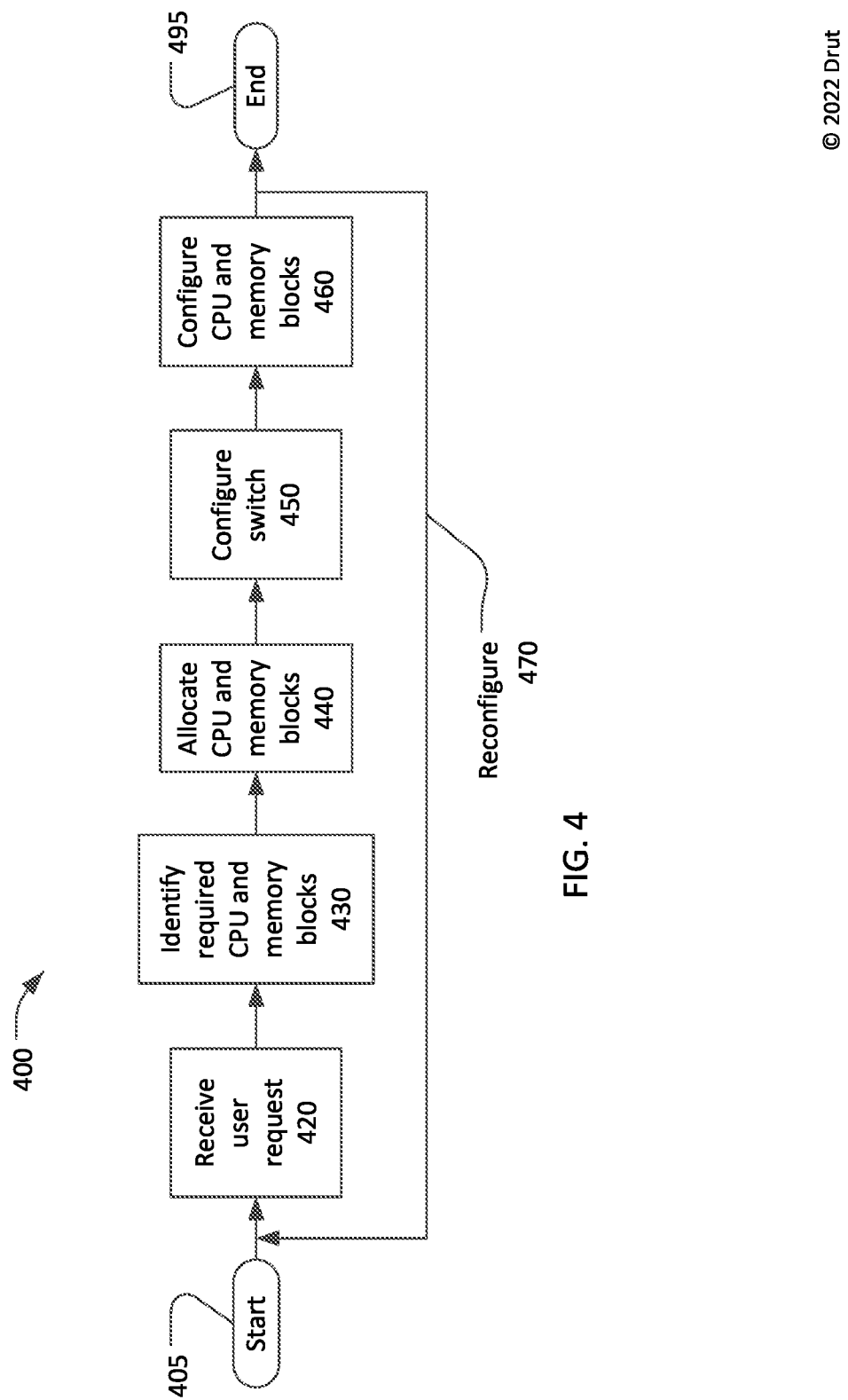
FIG. 4 is a flow chart of a process for allocation and reallocation of ranks of indirectly connected memory.

Referring now to FIG. 4, there is shown a process for allocation and reallocation of ranks of indirectly connected memory, such as those in memory modules 171, 172, 173 (FIG. 1). Referring now to FIG. 4, a process 400 to configure and/or reconfigure a server rack 100 such as by configuring at least one server and memory blocks of a memory sled or FICs thereof. Process 400 starts at 405 and ends at 495; but may be repeated to reconfigure the rack as shown by reconfigure arrow 470. The process 400 may be executed by a fabric manager 270, such as the fabric manager of any of FIGS. 2-3. Process 400 may be used to configure or reconfigure a rack, sled or FIC as noted herein. Since a rack may operate many sleds concurrently, multiple instantiations of the process 400 may run concurrently on the same or multiple fabric managers 270 such as to setup various networks between various ones of the sleds 100 and sleds 200.

The process 400 is initiated when the fabric manager 270 receives, at 420, a user request for a configuration of a compute node of rack 100, such as from agent 280. A compute node of the rack may be a configuration of at least one server and memory sled having memory blocks or FICs thereof. The user may request a compute node having a specified combination of CPU and memory blocks. In process 400, the CPU and memory sleds may refer to CPU and memory modules. Alternatively, the user may request a compute node for execution of a specified application (which may be provided by the user or by the data center), where the CPU and memory sleds required to run the specified application are known to the fabric manager.

In either case, at 430, the fabric manager identifies available CPU and memory blocks such as of one or more memory sleds for use in the requested compute node. A memory sled may have multiple memory blocks. For example, the fabric manager may maintain a list of available CPU and memory blocks (or a list of all CPU and memory blocks with a flag indicating whether or not each sled and block is available) of a computing cluster and simply select the required complement of CPU and memory blocks from the list. In another case, memory sleds may be listed, and a single sled selected, where that sled has desired blocks for the configuration. The selected CPU and memory blocks are then removed from the list of available CPU and memory blocks are allocated to the requested compute node. This identifying may include each FIC discovering all the CPU and memory blocks and/or functional elements connected to it and publishing a list of them to the fabric manager.

At 440, the architecture of the compute node, including the arrangement of communications paths between the CPU and memory blocks within the compute node, is determined. In the simplest case, where every CPU and memory blocks is connected to a switch 190 by one set of bidirectional communication paths, only certain CPU and memory blocks will communicate data with the switch and the architecture may be a bidirectional network as shown in FIG. 1. When all of the computing assets are connected to the switch 190 by more than two communications paths (e.g., wires 191 or 195) such that every CPU and memory block is connected to a switch 190 by a set of bidirectional communication paths for each other one of the CPU and memory blocks, complex architectures are possible. In all cases, the architecture of the compute node should be determined such that desired computing CPU and memory block pairs are directly connected by fabric interface devices configured to transparently extend memory buses by converting the memory bus data into retimed parallel optical version of the bus data to be sent on bidirectional data communication paths to and from the switch 190. Thus, the desired architecture does not have to consider having the highest inter-sled traffic directly connected or connected though the smallest number of intermediate computing sleds. Determining the architecture at 440 may also include configuring the fabric interface devices to converting the memory bus data from a first number of bus-width to the first bidirectional data communication path having a different second number of SERDES lanes. Determining the architecture at 440 may include transparently extending the memory bus between the computing assets via the FICs, data communications paths and the data path transport without the CPU and memory modules being aware of the fabric interface device or of the data communication paths and without changing the memory bus data transactions between those modules.

Converting memory bus data from a memory bridge into the retimed parallel version of the memory bus data may be or include combining address bus data, interface bus data and devices identification bus data of the memory bus data into a data-path-bundle for a selected number of SERDES lanes (e.g., number of bidirectional data communication paths) of the retimed parallel version that is in a different timing domain than the memory bus data. The memory bus data may include memory bus transactions (address, bus, devices) on a memory bridge having a first width of bus data lanes. These transactions and the number of bus data lanes are converted to a retimed, parallel version (in a different timing domain) to be sent over multiple transceivers on multiple SERDES lanes having a second width that is different than the first width of bus data lanes. The second width of SERDES lanes is fewer and may be a quarter the first width of the bus data lanes. The retimed parallel version data may be or includes actual data bus, address bus and device id mixed together.

Converting may involve converting 3 variable types of data bus lanes of the first width of memory bus data into the retimed parallel version. These 3 variable types may be: an interface bus with interface data width that varies from 32, 64, 128, 256 bits and so on up to 1024 bits wide; and address buss with address width that varies from 12 to 64 bits wide; and a device id bus with an actual number of devices on bus (master/slave) width. Conversion may include converting combinations of data from these three variables by multiplexing/demultiplexing the bus data onto the retimed data which is a data-path-bundle (retimed, different timing domain) consisting of a varying number of SERDES lanes, with 64 bits data stripped per SERDES lane.

The switch 190 (e.g., a data path transport) is configured at 450. To this end, the compute node or manager 270 may send commands to the optical circuit switch to set the appropriate mirrors such that the communications paths defined at 440 are physically realized.

The CPU and memory blocks including the fabric interface devices are configured at 460 by uploading configuration information or software as needed for the CPU and memory blocks to expected functions in the requested compute node. The upload may be from manager 270. This uploaded software may include programming code to program FICs and/or FPGAs attached to the CPU and memory sleds. This programming code may, for example, configure the FPGAs to execute the communications protocol(s) defined at 440.

Configuring the optical circuit switch at 450 and configuring the FICs at 460 may be done in either order or concurrently. Once the optical circuit switch and FICs have been configured, the compute node is ready for use by the requestor and the process 400 ends at 495.

In other cases, the process follows reconfigure arrow 470 and reconfigure the rack, CPU and memory blocks, and/or FICs. The reconfiguring may repeat all of actions at 420-460. In other cases, the reconfiguring may skip some of actions at 420-460. For example, it may not be necessary to reconfigure the switch at 450 for some reconfigurations of CPU and memory blocks at 460. In another example, it may not be necessary to reconfigure the CPU and memory blocks at 460 for some reconfigurations of the switch at 450.

Different system configurations may have different sensitivity points, e.g., multi processors or single processors, data-cache usage among cores, sockets, number of lanes, bus width and interconnects speeds, or coherency modes, and if one wants memory with ECC and a large capacity, there is a cost to selecting a specific configuration. Thus, round-trip latencies of memory (read/write/cache, etc.) commands are important aspect impacting system performance. Based upon current standards and products, memory disaggregation as described herein should support low latencies, such as less than 50 ns one-way. In some cases, it is supported by low latencies less than 70 or 80 ns one-way.

Additionally, whether all memory modules or ranks are allocated to a single CPU host or shared among multiple CPU hosts will introduce dependencies on drivers and controllers. For proper initializations, both CPU and memory should be validated as compatible and interoperable before attachment.

For example, a number of modules 171, 172, 173 or modules 370a, 370b can be allocated and reallocated to each CPU module 121 or 220. This allocation can depend on the memory resources needed by each CPU module.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, "logic" may be or include hardware and/or software needed to perform the function described for the logic. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. At least one server rack comprising:
a plurality of server sleds, each server sled comprising:
a first motherboard,
a first memory module mounted on the first motherboard,
a cache mounted on the first motherboard,
a CPU module mounted on the first motherboard and having at least one CPU directly connected to the cache,
a first memory controller directly connected to the cache and the first memory module,
an I/O hub,
a first fabric interface mounted on the first motherboard and having a first memory bridge and a first plurality of optical transceivers, wherein the first memory bridge is directly connected to the I/O hub through the first motherboard;
a memory sled that is disaggregated from the plurality of server sleds, the memory sled comprising:
a second motherboard;
a plurality of second memory modules mounted on the second motherboard,
a second fabric interface mounted on the second motherboard and having a second memory bridge and a second memory controller and a second plurality of optical transceivers, wherein the second memory controller is directly connected to the second memory modules through the second motherboard, and wherein the second memory bridge connects the second memory controller to the second plurality of optical transceivers;
a photonic cross-connect switch;
a first plurality of optical fiber cables interconnecting the photonic cross-connect switch and the first optical transceivers;
a second plurality of optical fiber cables interconnecting the photonic cross-connect switch and the second optical transceivers.

2. The least one server rack of claim 1, wherein the first fabric interface comprises a first data path transport to convert memory bus data from the first memory bridge into a retimed parallel version of the memory bus data to be sent by the first plurality of optical transceivers over the photonic cross-connect switch to a second data path transport of the second fabric interface.

3. The least one server rack of claim 1, wherein memory blocks of the memory sled and each of the plurality of server sleds are reconfigurable by selecting the memory sled to be connected through the photonic cross-connect switch to any one or more of the server sleds based on the memory resources needed by each server sled.

4. The least one server rack of claim 1, wherein the memory sled is a first memory sled and further comprising:
a second memory sled that is disaggregated from the plurality of server sleds, the second memory sled comprising:
a third motherboard;
a plurality of third memory modules mounted on the third motherboard,
a third fabric interface mounted on the third motherboard and having a third memory bridge and a third memory controller and a third plurality of optical transceivers, wherein the third memory controller is directly connected to the third memory modules through the third motherboard, and wherein the third memory bridge connects the third memory controller to the third plurality of optical transceivers;
a third plurality of optical fiber cables interconnecting the photonic cross-connect switch and the third optical transceivers.

5. The least one server rack of claim 4, wherein memory blocks of the first and second memory sled and each of the plurality of server sleds are reconfigurable by selecting one of the first or second memory sled to be connected through the photonic cross-connect switch to any one or more of the server sleds based on the memory resources needed by each server sled.

6. The least one server rack of claim 4, wherein the first and second memory sled are connected through the photonic cross-connect switch to a first one of the server sleds, wherein the first but not the second memory sled is connected through the photonic cross-connect switch to a second one of the server sleds, and wherein the second but not the first memory sled is connected through the photonic cross-connect switch to a third one of the server sleds.

7. The least one server rack of claim 1, wherein the memory sled includes multiple memory modules (DIMMs)

that are arranged as memory blocks on a board to be associated with the first and second memory controllers such that each of the first and second memory controller can be represented as a memory resource block to a fabric manager.

8. The least one server rack of claim 7, wherein each memory block can be attached or detached to a plurality of CPUs of the at least one CPU.

9. The least one server rack of claim 7, wherein multiple memory modules (DIMMs) can be accessed by more than one CPU of the at least one CPU when connected from different CPUs of the at least one CPU as a shared memory resource.

10. The least one server rack of claim 1, wherein converting memory bus data from the first memory bridge into the retimed parallel version of the memory bus data includes combining address bus data, interface bus data and devices identification bus data of the memory bus data into a data-path-bundle for a selected number of SERDES lanes of the retimed parallel version that is in a different timing domain than the memory bus data.

11. A server rack comprising:
a server sled having:
  a first motherboard,
  a memory module mounted on the first motherboard,
  a cache mounted on the first motherboard,
  a CPU module mounted on the first motherboard and having at least one CPU directly connected to the cache,
  a memory controller directly connected to the cache and the memory module,
  an I/O hub,
  a first fabric interface mounted on the motherboard and having:
    a first memory bridge and a first plurality of optical transceivers, wherein the first memory bridge is directly connected to the I/O hub through the first motherboard, and
    a first data path transport to convert memory bus data from the first memory bridge into a retimed parallel version of the memory bus data to be sent by the first plurality of optical transceivers over a photonic cross-connect switch to a memory sled that is disaggregated from the server sled.

12. The server rack of claim 11, further comprising:
the memory sled having:
  a second motherboard;
  a plurality of memory modules mounted on the second motherboard,
  a second fabric interface mounted on the second motherboard and having:
    a second memory bridge and a memory controller and a second plurality of optical transceivers, wherein the memory controller is directly connected to the plurality of memory modules through the second motherboard, and wherein the second memory bridge connects the memory controller to the second plurality of optical transceivers, and
    a second data path transport to convert memory bus data from the second memory bridge into a retimed parallel version of the memory bus data to be sent by the second plurality of optical transceivers over the photonic cross-connect switch to the server sled that is disaggregated from the memory sled.

13. The server rack of claim 12, wherein the first and second data path transports are reconfigurable by selecting a number of the plurality of memory modules to be connected through the photonic cross-connect switch to any one or more of the at least one CPU based on the memory resources needed by each server sled.

14. The server rack of claim 13, wherein the first and second data path transports are configured to selecting two of the plurality of memory modules to be connected through the photonic cross-connect switch to a first of the at least one CPU, and to select one of the plurality of memory modules to be connected through the photonic cross-connect switch to a second of the at least one CPU.

15. The server rack of claim 12, wherein converting the memory bus data from the first and second memory bridge into the retimed parallel version of the memory bus data includes combining address bus data, interface bus data and devices identification bus data of the first and second memory bridges into a data-path-bundle for a selected number of SERDES lanes of the retimed parallel version that is in a different timing domain than the first and second memory bridges.

16. An apparatus comprising:
a first fabric interface (FIC) comprising:
  a memory bridge;
  a plurality of transport protocols, each connected between the memory bridge and a plurality of PHYs;
  the plurality of PHYs;
  a plurality of optical transceivers directly connected to respective PHYs,
  the data path transport to convert memory bus data from the memory bridge into a retimed parallel version of the memory bus data to be sent by the optical transceivers over a photonic cross-connect switch to a second FIC that is disaggregated from the first FIC.

17. The apparatus of claim 16 further comprising:
a board on which the first fabric interface is mounted;
at least one memory module mounted on the board; and
at least one CPU module mounted on the board, the CPU module comprising at least one CPU and a memory controller interconnecting the CPU and the at least one memory module.

18. The apparatus of claim 16 further comprising:
a board on which the first fabric interface is mounted;
a plurality of memory modules mounted on the board; and
a memory controller interconnecting the memory bridge and the memory modules.

19. The apparatus of claim 18, wherein the plurality of memory modules are arranged as memory blocks on the board to be associated with the memory controllers such that the memory controller can be represented as a memory resource block to a fabric manager.

20. The apparatus of claim 19, wherein each memory block can be attached or detached to a plurality of CPUs.

21. The apparatus of claim 19, wherein the plurality of memory modules can be accessed by more than one CPU when connected from different CPUs as a shared memory resource.

22. The apparatus of claim 16, wherein converting memory bus data from the memory bridge into the retimed parallel version of the memory bus data includes combining address bus data, interface bus data and devices identification bus data of the memory bridge into a data-path-bundle for a selected number of SERDES lanes of the retimed parallel version that is in a different timing domain than the memory bridge data.

* * * * *